Figure 1:
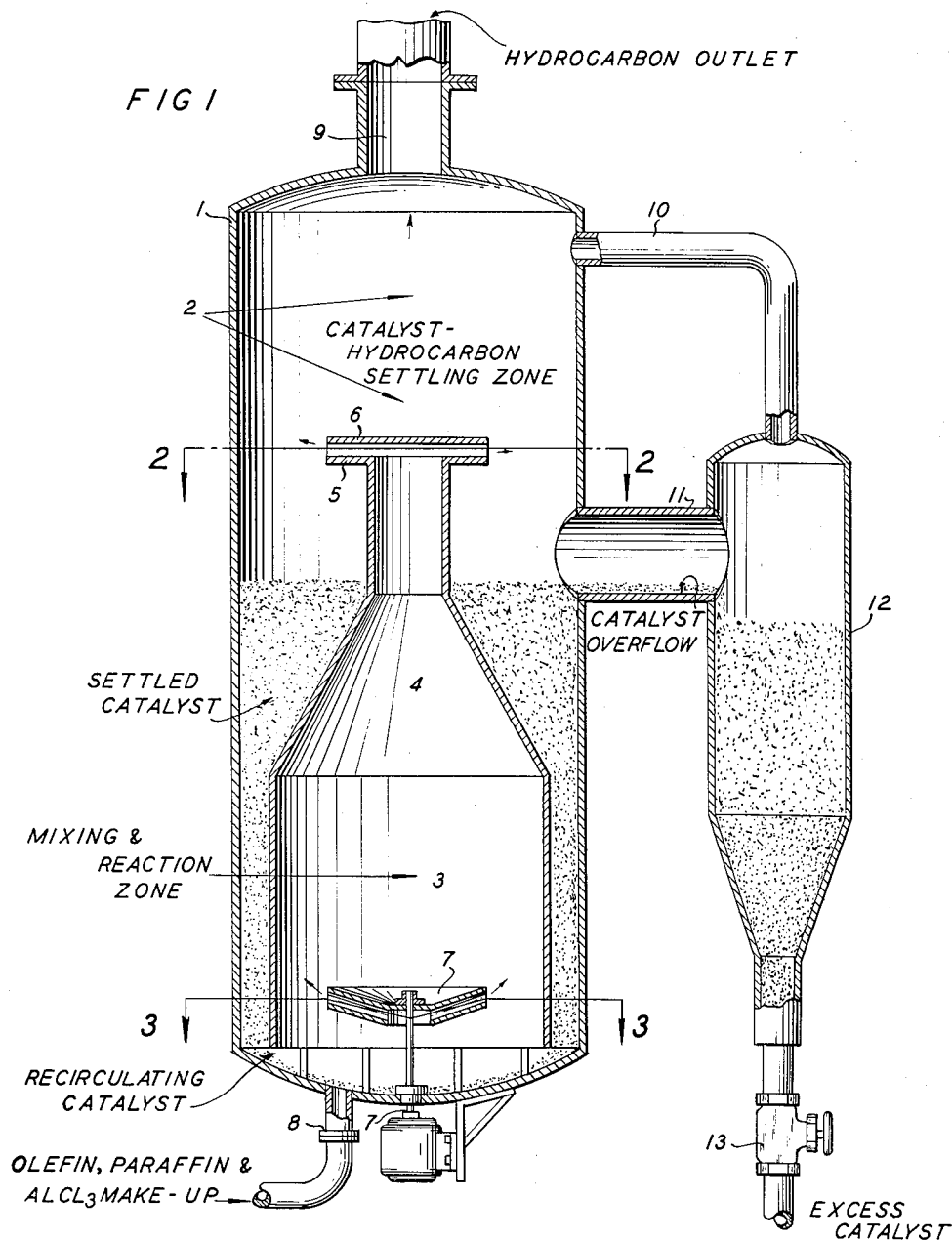

May 22, 1956  M. O. KILPATRICK  2,747,003
METHOD AND APPARATUS FOR INTIMATELY CONTACTING
AND THEN SEPARATING IMMISCIBLE FLUIDS
Filed June 17, 1952  2 Sheets-Sheet 2

INVENTOR.
M.O. KILPATRICK
BY
*Hudson & Young*
ATTORNEYS

# United States Patent Office 2,747,003
Patented May 22, 1956

2,747,003

METHOD AND APPARATUS FOR INTIMATELY CONTACTING AND THEN SEPARATING IMMISCIBLE FLUIDS

Myron O. Kilpatrick, Bartlesville, Okla., assignor to Phillips Petroleum Company, a corporation of Delaware Application June 17, 1952, Serial No. 293,967

16 Claims. (Cl. 260—683.4)

This invention relates to a method and to an apparatus for intimately contacting and then separating from each other at least two fluids which are immiscible. In one of its aspects this invention provides an improved method for rapidly and thoroughly admixing with each other fluids which are immiscible and then rapidly causing separation of said fluids. In another of its aspects this invention provides a method for contacting a reactant with another reactant or catalyst which is substantially immiscible with said first mentioned reactant in an improved manner and under conditions such as to permit a sharper control of the time during which the said reactant or catalyst immiscible with said first mentioned reactant remains in admixture therewith than has been possible heretofore. In still another of its aspects this invention relates to a method for contacting organic materials, for example, hydrocarbons with a catalyst to cause conversion of the said hydrocarbons, for example, alkylation, isomerization, polymerization, etc. In still another aspect this invention relates to a method and to an apparatus in which immiscible fluids can be rapidly admixed and rapidly separated each from the other after a desired time of contact in a manner and under conditions such that centrifugal force is caused or permitted to assist in the rapid settling and consequent separation of said fluids.

According to this invention there are provided a method and apparatus for causing intimate contact between and subsequent separation of a plurality of substantially immiscible fluids which comprises providing in a vertically disposed contacting zone a lower mixing section and an upper settling section; further providing a vertically disposed riser zone in open communication with the lower central portion of said mixing section and the lower central portion of said upper settling section; in the bottom of said contacting zone admixing said fluids by rotating and upwardly impelling the same; passing the thus admixed and rotated upwardly impelled fluids through said riser zone into the lower portion of said upper settling section; therein causing and allowing settling of heavier portions of said admixture from lighter portions of said admixture; internally of said contacting zone, from a lower peripheral portion of said upper settling section drawing peripherally and downwardly said heavier portion of said settled fluids to the bottom of said contacting zone; then passing said fluid from the periphery of the bottom of said contacting zone into a central portion of said lower mixing section and therein admixing said fluid with additional fluids to be admixed therewith which last mentioned fluids are also introduced into said lower central portion of said lower mixing section.

The invention has especially valuable application in the treatment of organic materials such as hydrocarbons in the presence of catalyst, for example, in the alkylation of hydrocarbons. One such application is, specifically, found in a preparation of high octane value fuel components by the alkylation of ethylene and isobutane in the presence of an aluminum chloride alkylation catalyst. Other alkylation catalysts which are useful to cause alkylation of hydrocarbons are hydrofluoric acid, sulfuric acid, etc. While the invention will now be described in respect of the above mentioned specific application to alkylation reactions, a reaction of especial interest being that of ethylene and isobutane in the presence of an aluminum chloride catalyst to form diisopropyl, it is to be understood that the invention here set forth and described is not limited except as required under the patent law applicable to the claims appended hereto.

Figure 2:
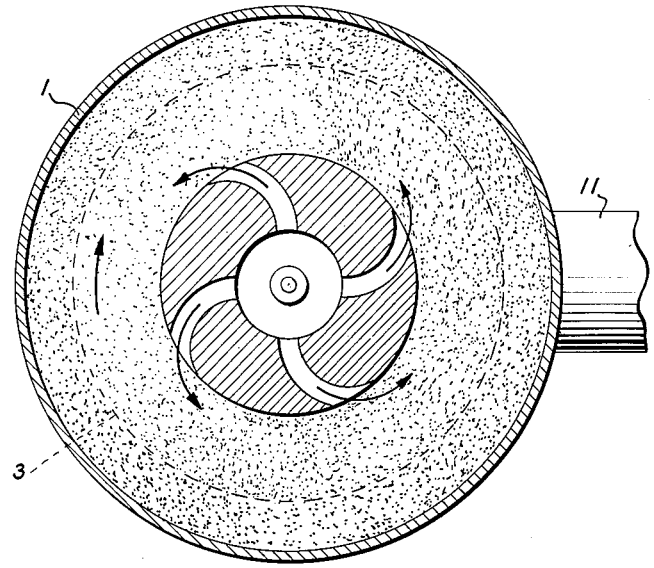
Figure 3:
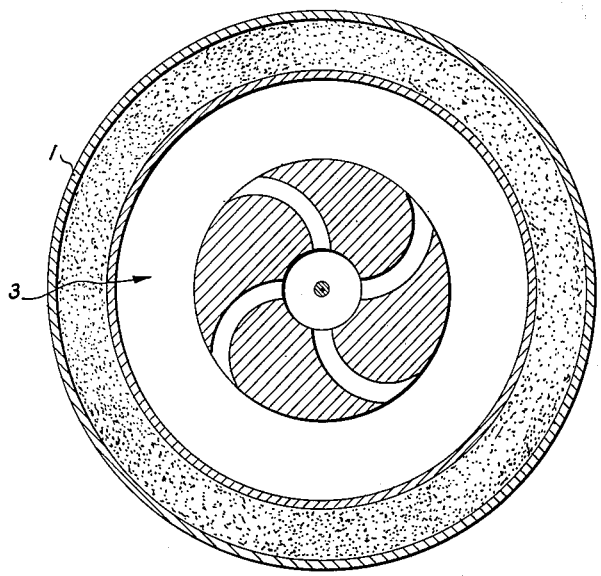

Referring now to the drawings, Figure 1 illustrates in vertical cross-section a device suited to the process of my invention and Figures 2 and 3 respectively are horizontal cross-sections taken at lines 2 and 3. In Figure 1 of the drawing, 1 is a vessel having an upper settling section 2 and a lower mixing and reaction section 3. 4 is an inverted funnel shaped riser device having flanged end 5 opposite and spaced from which is suitably suspended a baffle 6. Vessel 1 is equipped at its bottom with rotating mixing-impelling means 7 and an inlet 8; at the top there is provided outlet 9. Appended to and in open communication with vessel 1 by means of conduits 10 and 11 is auxiliary vessel 12 which is equipped with a flow regulation means or valve 13.

In operation, for example in the alkylation of isobutane with ethylene in the presence of aluminum chloride catalyst, the vessel 1 is filled to a level substantially as shown with isobutane and aluminum chloride catalyst in proportions which are well-known in the art, the rotating mixing means 7 is placed into motion and when the vessel contents are being thoroughly and rapidly admixed and upwardly impelled and otherwise circulated, ethylene, additional isobutane and aluminum chloride make-up catalyst are added at the bottom of the vessel through conduit 8 from a suitable source not shown, and as the level of the catalyst tends to build up in vessel 1, it will overflow into vessel 12. When the level in vessel 12 is maintained as shown in the drawing, the catalyst level within the reactor vessel 1 is automatically maintained substantially at that of the lowest portion of conduit 11. However, by suitably throttling valve 13, it is possible to modify the level of the catalyst within 1.

Owing to the centrifugal force imparted to the mixture rising through inverted funnel 4, as will be readily understood, the heavier portion of the mixture, namely, the catalyst, is driven to the side wall of the inverted funnel and ultimately passed up and out therefrom between the flanged end 5 and the baffle 6 to the wall of vessel 1 causing immediately the separation of the catalyst from hydrocarbons which pass under the annular baffle 6 into section 2 and ultimately out from vessel 1 through conduit 9. It will be obvious to one skilled in the art that the location of conduit 9 can be at the side of vessel 1 and that the depth of section 2 can be engineered to provide a suitable settling time to remove the more finely suspended particles of catalyst. Furthermore, in the event that a separation is desired to be made in that instance in which there may be stratification into more than two strata, conduit 9 can be retained and another conduit placed at a suitable level on the side of vessel 1.

Any gases or vapors which separate from the catalyst in chamber 12 are constantly returned to vessel 1 through conduit 10. The catalyst removed through valve 13 can be returned to conduit 8 with or without refortification. Hydrocarbons removed through conduit 9 are processed as known in the art. Patent Numbers 2,410,498 and 2,464,682, H. J. Hepp, issued November 5, 1946, and March 15, 1949, respectively, and Patent Number 2,518,307, J. L. Groebe, issued August 8, 1950, contain information in respect of alkylation reactions and conditions as these are known in the prior art.

It will be apparent to one skilled in the art having studied carefully this disclosure that the method and apparatus of the invention considerably simplify the steps and apparatus parts required to obtain an improved rapid and intimate contacting of immiscible fluids for a sharply controlled interval of time and that while variation and modification are possible within the scope of the foregoing disclosure and the appended claims to the invention its essence lies in the combination of the steps as disclosed causing or permitting the use of centrifugal force to aid in the rapid separation of the heavier portion of the admixed fluids from a lighter portion of the admixture of said fluids.

I claim:

1. The method of causing intimate contact between and subsequent separation of at least two substantially immiscible liquids which comprises providing in a laterally confined vertically disposed contacting zone a lower mixing section and an upper settling section; providing communication of said lower mixing section and said upper settling section by a laterally confined vertically disposed unimpeded riser zone in open communication with the lower central portion of said mixing section and the lower central portion of said upper settling section; internally in said laterally confined vertically disposed contacting zone, from a lower peripheral portion of said upper settling section, drawing peripherally downwardly a liquid heavier than a complete admixture of said liquids; passing said liquid to the periphery of the bottom of said contacting zone; then passing said liquid from the periphery of the bottom of said contacting zone into a lower central portion of said lower mixing section; in said lower central portion of said lower mixing section admixing with said liquid now therein additional liquids to be admixed therewith; rotating in said mixer section the liquid admixture thus obtained to impart a centrifugal force thereto; and passing the thus obtained liquid admixture centrally within said mixing section upwardly through said riser zone and then horizontally into said upper settling section to cause separation of said liquids by the centrifugal force thereof.

2. The method of causing intimate contact between and subsequent separation of a liquid hydrocarbon stream and a catalyst liquid immiscible therewith and having a specific gravity greater than said hydrocarbon stream which comprises providing in a laterally confined vertically disposed contacting zone a lower mixing section and an upper catalyst settling section; providing in said lower mixing section a laterally confined vertically disposed riser zone in open communication with the lower central portion of said mixing section and the lower central portion of said upper catalyst settling section; internally in said laterally confined vertically disposed contacting zone, from a lower peripheral portion of said upper catalyst settling section, drawing peripherally downwardly a catalyst liquid heavier than a complete admixture of said liquid hydrocarbon stream and said catalyst; passing said catalyst liquid to the periphery of the bottom of said contacting zone; then passing said catalyst liquid from the periphery of the bottom of said mixing zone into a lower central portion of said lower mixing section; in said lower central portion of said lower mixing section admixing with said catalyst liquid now therein additional liquids to be admixed therewith; rotating in said mixer section the liquid admixture thus obtained to impart a centrifugal force thereto; and passing the thus obtained liquid admixture centrally within said mixing section upwardly through said riser zone and then horizontally into said upper settling section to cause separation of liquid hydrocarbon from liquid catalyst by centrifugal force imparted thereto.

3. A method according to claim 2 wherein the hydrocarbon stream contains an alkylatable and an alkylating compound and the catalyst is an alkylation catalyst.

4. A method according to claim 3 wherein the catalyst is an aluminum chloride catalyst.

5. A method according to claim 3 wherein the catalyst is a hydrofluoric acid catalyst.

6. In the alkylation of liquid isobutane with ethylene to produce a high octane value gasoline component; the method of causing intimate contact between said isobutane, ethylene and an aluminum chloride catalyst and subsequent separation of hydrocarbon reaction mixture from said catalyst which comprises providing in a laterally confined vertically disposed contacting zone a lower mixing section and an upper settling section; providing in said lower mixing section a laterally confined vertically disposed riser zone in open communication with the lower central portion of said mixing section and the lower central portion of said upper settling section; internally in said laterally confined vertically disposed contacting zone, from a lower peripheral portion of said upper settling section, drawing peripherally downwardly catalyst fluid heavier than the admixture of said hydrocarbon and catalyst; passing said fluid to the periphery of the bottom of said contacting zone; then passing said fluid from the periphery of the bottom of said mixing zone into a lower central portion of said lower mixing section; in said lower central portion of said lower mixing section admixing with said fluid now therein at least one of additional hydrocarbon and catalyst to be admixed therewith; rotating and upwardly impelling in said mixer section the admixture thus obtained to impart a centrifugal force thereto and to impel said admixture centrally within said mixing section upwardly through said riser zone and then horizontally into said upper settling section to cause separation of hydrocarbon from catalyst by the centrifugal force imparted thereto.

7. A method according to claim 2 wherein provided with said contacting zone is a separate auxiliary laterally confined vertically disposed zone, in open communication at a locus intermediate its ends with a lower portion of said upper settling section and in open communication at its upper end with an upper portion of said upper settling section and wherein the level of said liquid, heavier than the admixture of said liquids, in said upper settling section is regulated by regulating the level in said separate auxiliary zone.

8. A method according to claim 7 wherein the level in said separate auxiliary zone is regulated by altering the quantity of fluid therein.

9. A combined fluids mixing and separation apparatus comprising in combination a substantially vertically disposed vessel; in said vessel an empty riser conduit having substanitally the shape of an inverted funnel in open communication at its lower end with a lower portion of said vessel and at its upper end with a portion of said vessel intermediate the upper and lower ends of said vessel and a rotatable mixer-impeller so arranged in the bottom of said vessel at the bottom end of said riser conduit and with respect to said riser conduit as to mix and rotatingly upwardly impel through said riser fluids which are in the bottom of said vessel.

10. Apparatus according to claim 9 wherein the upper end of said inverted funnel, as disposed within said vessel, is flanged and there is provided a baffle member spaced from and above said upper flanged end of said inverted funnel as disposed in said vessel.

11. Apparatus according to claim 10 wherein there are provided an inlet to the bottom of said vessel; an outlet at the top of said vessel; an auxiliary vessel communicating at a point intermediate its upper and lower ends with said first mentioned vessel at a point above the bottom of said first mentioned vessel but below the flanged portion of said inverted funnel; said auxiliary vessel also communicating by means of a conduit with the upper portion of said first mentioned vessel above said baffle and an outlet at the bottom of said auxiliary vessel.

12. The method of causing intimate contact between and subsequent separation of at least two substantially immiscible liquids which comprises providing in a laterally confined vertically disposed contacting zone a relatively large lower mixing section and an upper settling section; providing communication of said lower mixing section and said upper settling section by a laterally confined vertically disposed unimpeded riser zone in open communication with the lower central portion of said mixing section and the lower central portion of said upper settling section, said riser zone having a relatively large and diminishing cross-section in the line of flow of upwardly rising liquids therein; internally in said laterally confined vertically disposed contacting zone, from a lower peripheral portion of said upper settling section, drawing peripherally downwardly a liquid heavier than a complete admixture of said liquids; passing said liquid to the periphery of the bottom of said contacting zone; then passing said liquid from the periphery of the bottom of said contacting zone into a lower central portion of said relatively large lower mixing section; in said lower central portion of said relatively large lower mixing section admixing with said liquid now therein additional liquids to be admixed therewith; rotating in said relatively large mixer section the liquid admixture thus obtained to impart a centrifugal force thereto; and passing the thus obtained liquid admixture centrally within said mixing section upwardly through said riser zone of diminishing cross-section and then horizontally into said upper settling section to cause separation of said liquids by the centrifugal force thereof.

13. The method of causing intimate contact between and subsequent separation of a liquid hydrocarbon stream and a catalyst liquid immiscible therewith and having a specific gravity greater than said hydrocarbon stream which comprises providing in a laterally confined vertically disposed contacting zone a relatively large lower mixing section and an upper catalyst settling section; providing in said lower mixing section a laterally confined vertically disposed riser zone in open communication with the lower central portion of said mixing section and the lower central portion of said upper catalyst settling section, said riser zone having a relatively large and diminishing cross-section in the line of flow of upwardly rising liquids therein; internally in said laterally confined vertically disposed contacting zone, from a lower peripheral portion of said upper catalyst settling section, drawing peripherally downwardly a catalyst liquid heavier than a complete admixture of said liquid hydrocarbon stream and said catalyst; passing said catalyst liquid to the periphery of the bottom of said contacting zone; then passing said catalyst liquid from the periphery of the bottom of said mixing zone into a lower central portion of said relatively large lower mixing section; in said lower central portion of said relatively large lower mixing section admixing with said catalyst liquid now therein additional liquids to be admixed therewith; rotating in said relatively large mixer section the liquid admixture thus obtained to impart a centrifugal force thereto; and passing the thus obtained liquid admixture centrally within said mixing section upwardly through said riser zone of diminishing cross-section and then horizontally into said upper settling section to cause separation of liquid hydrocarbon from liquid catalyst by centrifugal force imparted thereto.

14. A combined fluids mixing and separation apparatus comprising in combination a substantially vertically disposed vessel; in said vessel an empty riser conduit having substantially the shape of an inverted funnel in open communication at its lower end with a lower end with a lower portion of said vessel and at its upper end with a portion of said vessel intermediate the upper and lower ends of said vessel and a rotatable mixer-impeller so arranged in the bottom of said vessel at the bottom end of said riser conduit and with respect to said riser conduit as to mix and rotatingly upwardly impel through said riser fluids which are in the bottom portion of said vessel; the upper end of said inverted funnel, as disposed within said vessel, being flanged and there being provided a baffle member spaced from and above said upper flanged end of said inverted funnel as disposed in said vessel.

15. A combined fluids mixing and separation apparatus comprising in combination a substantially vertically disposed vessel; in said vessel an empty riser conduit having substantially the shape of an inverted funnel in open communication at its lower end with a lower portion of said vessel and at its upper end with a portion of said vessel intermediate the upper and lower ends of said vessel; a rotatable mixer-impeller so arranged in the bottom of said vessel at the bottom end of said riser conduit and with respect to said riser conduit as to mix and rotatingly upwardly impel through said riser fluids which are in the bottom of said vessel; an inlet to the bottom of said vessel; an outlet at the top of said vessel; an auxiliary vessel in combination with said first-mentioned vessel communicating at a point intermediate its upper and lower ends with said first-mentioned vessel at a point above the bottom of said first-mentioned vessel but below the upper end of said inverted funnel; said auxiliary vessel also communicating by means of a conduit with the upper portion of said first-mentioned vessel above said upper end of said inverted funnel and an outlet at the bottom of said auxiliary vessel.

16. A combined fluids mixing and separation apparatus comprising in combination a substantially vertically disposed vessel; in said vessel an empty riser conduit having substantially the shape of an inverted funnel in open communication at its lower end with a lower portion of said vessel and its upper end with a portion of said vessel intermediate the upper and lower ends of said vessel; a rotatable mixer-impeller so arranged in the bottom of said vessel at the bottom end of said riser conduit and with respect to said riser conduit as to mix and rotatingly upwardly impel through said riser fluids which are in the bottom of said vessel; the upper end of said inverted funnel, as disposed within said vessel, being flanged and there being provided a baffle member spaced from and above said upper flanged end of said inverted funnel as disposed in said vessel; an inlet to the bottom of said vessel; an outlet at the top of said vessel; an auxiliary vessel communicating at a point intermediate its upper and lower ends with said first-mentioned vessel at a point above the bottom of said first-mentioned vessel but below the flanged portion of said inverted funnel; said auxiliary vessel also communicating by means of a conduit with the upper portion of said first-mentioned vessel above said baffle and an outlet at the bottom of said auxiliary vessel.

References Cited in the file of this patent

UNITED STATES PATENTS

| Number | Name | Date |
|---|---|---|
| 2,000,606 | Othmer | May 7, 1935 |
| 2,308,786 | Smith | Jan. 19, 1943 |
| 2,381,256 | Callaway | Aug. 7, 1945 |
| 2,419,097 | Stratford et al. | Apr. 15, 1947 |
| 2,450,174 | Weinrich et al. | Sept. 28, 1948 |
| 2,453,592 | Putney | Nov. 9, 1948 |
| 2,454,149 | Franklin | Nov. 16, 1948 |
| 2,487,370 | Putney | Nov. 8, 1949 |
| 2,584,391 | Leffer | Feb. 5, 1952 |